US011509938B2

(12) United States Patent
Lai et al.

(10) Patent No.: US 11,509,938 B2
(45) Date of Patent: Nov. 22, 2022

(54) METHOD AND APPARATUS OF SIGNALING SUBPICTURE INFORMATION IN VIDEO CODING

(71) Applicant: MEDIATEK INC., Hsinchu (TW)

(72) Inventors: Chen-Yen Lai, Hsinchu (TW); Shih-Ta Hsiang, Hsinchu (TW); Olena Chubach, San Jose, CA (US); Tzu-Der Chuang, Hsinchu (TW); Ching-Yeh Chen, Hsinchu (TW); Lulin Chen, San Jose, CA (US)

(73) Assignee: HFI INNOVATION INC., Zhubei (TW)

( * ) Notice: Subject to any disclaimer, the term of this patent is extended or adjusted under 35 U.S.C. 154(b) by 22 days.

(21) Appl. No.: 17/087,671

(22) Filed: Nov. 3, 2020

(65) Prior Publication Data

US 2021/0136420 A1 May 6, 2021

Related U.S. Application Data

(60) Provisional application No. 62/958,205, filed on Jan. 7, 2020, provisional application No. 62/954,022, filed
(Continued)

(51) Int. Cl.
*H04B 1/66* (2006.01)
*H04N 7/12* (2006.01)
(Continued)

(52) U.S. Cl.
CPC ........... *H04N 19/70* (2014.11); *H04N 19/172* (2014.11); *H04N 19/184* (2014.11)

(58) Field of Classification Search
CPC ............................ H04N 19/172; H04N 19/70
See application file for complete search history.

(56) References Cited

U.S. PATENT DOCUMENTS

2004/0208474 A1 10/2004 Brelay
2012/0026394 A1 2/2012 Maruyama
(Continued)

FOREIGN PATENT DOCUMENTS

WO 2007/114023 A1 10/2007
WO 2018/221368 A1 12/2018
WO 2019/008174 A1 1/2019

OTHER PUBLICATIONS

Brass et al. (Versatile Video Coding (Draft 7), Joint Video Experts Team (JVET) of ITU-T SG 16 WP 3 and ISO/IEC JTC 1/SC 29/WG 11, JVET-P2001 16th Meeting: Geneva, CH (Year: 2019).*
(Continued)

*Primary Examiner* — Fabio S Lima
(74) *Attorney, Agent, or Firm* — McClure, Qualey & Rodack, LLP

(57) ABSTRACT

Methods and apparatus for video coding are disclosed. According to one method, a bitstream is generated or received, where the bitstream includes a first syntax and a second syntax. The first syntax is related to a target number of bits used to represent a set of third syntaxes and each third syntax specifies one subpicture ID for one subpicture in a set of subpictures. The second syntax is related to a total number of subpictures in the set of subpicture, where a first number that can be represented by the target number of bits is equal to or greater than the total number of subpictures. According to another method, the subpicture ID syntaxes have different values for different subpictures.

8 Claims, 6 Drawing Sheets

Related U.S. Application Data on Dec. 27, 2019, provisional application No. 62/930,705, filed on Nov. 5, 2019.

(51) Int. Cl.
| | | |
|---|---|---|
| *H04N 11/02* | (2006.01) | |
| *H04N 11/04* | (2006.01) | |
| *H04N 19/70* | (2014.01) | |
| *H04N 19/172* | (2014.01) | |
| *H04N 19/184* | (2014.01) | |

(56) References Cited

U.S. PATENT DOCUMENTS

| | | |
|---|---|---|
| 2014/0086342 A1 | 3/2014 | Wang |
| 2020/0177922 A1 | 6/2020 | Chujoh et al. |
| 2021/0337228 A1* | 10/2021 | Wang .................... H04N 19/17 |
| 2021/0409785 A1* | 12/2021 | Wang .................... H04N 19/46 |
| 2022/0132170 A1* | 4/2022 | Wang ................... H04N 19/172 |

OTHER PUBLICATIONS

International Search Report and Written Opinion dated Jan. 15, 2021, issued in application No. PCT/CN2020/126716.

Bross, B. et al.; "Versatile Video Coding (Draft 7);" Joint Video Experts Team (JVET) of ITU-T SG 16 WP 3 and ISO/IEC JTC 1/SC 29/WG 11; Oct. 2019; pp. 1-494.

Chinese Language Office Action dated Mar. 3, 2022 of its corresponding Taiwan patent application.

\* cited by examiner $$\begin{bmatrix} 16 & 16 & 16 & 16 \\ 16 & 16 & 16 & 16 \\ 16 & 16 & 16 & 16 \\ 16 & 16 & 16 & 16 \end{bmatrix} \quad \leftarrow 310$$

Default 4x4 for IntraLuma, IntraCb, IntraCr, InterLuma, InterCb, InterCr $$\begin{bmatrix} 16 & 16 & 16 & 16 & 17 & 18 & 21 & 24 \\ 16 & 16 & 16 & 16 & 17 & 19 & 22 & 25 \\ 16 & 16 & 17 & 18 & 20 & 22 & 25 & 29 \\ 16 & 16 & 18 & 21 & 24 & 27 & 31 & 36 \\ 17 & 17 & 20 & 24 & 30 & 35 & 41 & 47 \\ 18 & 19 & 22 & 27 & 35 & 44 & 54 & 65 \\ 21 & 22 & 25 & 31 & 41 & 54 & 70 & 88 \\ 24 & 25 & 29 & 36 & 47 & 65 & 88 & 115 \end{bmatrix} \quad \leftarrow 320$$

Default 8x8 for IntraLuma, IntraCb, IntraCr $$\begin{bmatrix} 16 & 16 & 16 & 16 & 17 & 18 & 20 & 24 \\ 16 & 16 & 16 & 17 & 18 & 20 & 24 & 25 \\ 16 & 16 & 17 & 18 & 20 & 24 & 25 & 28 \\ 16 & 17 & 18 & 20 & 24 & 25 & 28 & 33 \\ 17 & 18 & 20 & 24 & 25 & 28 & 33 & 41 \\ 18 & 20 & 24 & 25 & 28 & 33 & 41 & 54 \\ 20 & 24 & 25 & 28 & 33 & 41 & 54 & 71 \\ 24 & 25 & 28 & 33 & 41 & 54 & 71 & 91 \end{bmatrix} \quad \leftarrow 330$$

Default 8x8 for InterLuma, InterCb, InterCr

Fig. 3

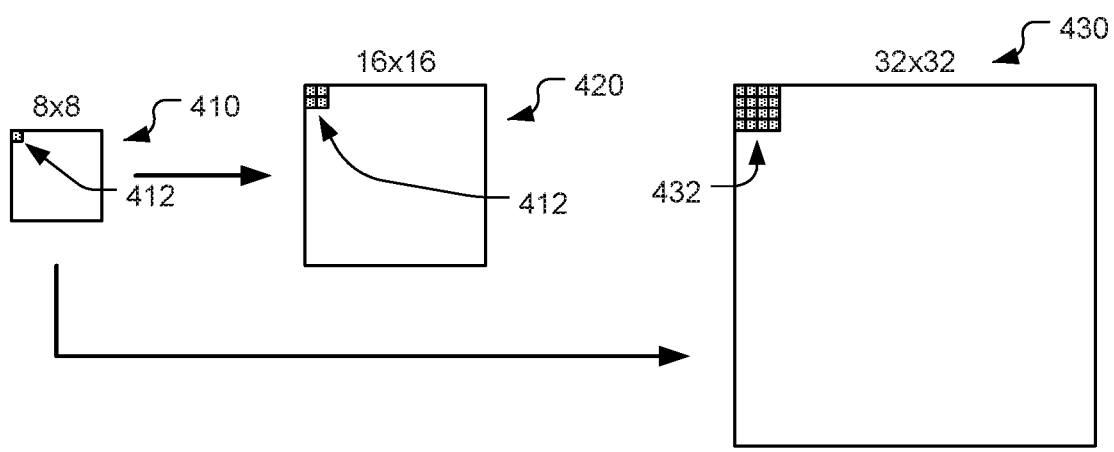

Fig. 4

METHOD AND APPARATUS OF SIGNALING SUBPICTURE INFORMATION IN VIDEO CODING

CROSS REFERENCE TO RELATED APPLICATIONS

The present invention claims priority to U.S. Provisional Patent Application, Ser. No. 62/930,705, filed on Nov. 5, 2019, U.S. Provisional Patent Application, Ser. No. 62/954,022, filed on Dec. 27, 2019 and U.S. Provisional Patent Application, Ser. No. 62/958,205, filed on Jan. 7, 2020. The U.S. Provisional Patent Applications are hereby incorporated by reference in their entireties.

FIELD OF THE INVENTION

The present invention relates to video coding. In particular, the present invention discloses techniques of signaling subpicture information for video coding.

BACKGROUND AND RELATED ART

Adaptive Intra/Inter video coding has been widely used in various video coding standards, such as MPEG-2, AVC (advanced video coding) and HEVC (High Efficiency Video Coding). In adaptive Intra/Inter video coding, an input signal is predicted by Intra/Inter predictor to generate prediction residues. The residues are often processed by a two-dimensional transform and quantized. The quantized transform coefficients are then coded. The High Efficiency Video Coding (HEVC) standard is developed under the joint video project of the ITU-T Video Coding Experts Group (VCEG) and the ISO/IEC Moving Picture Experts Group (MPEG) standardization organizations, and is especially with partnership known as the Joint Collaborative Team on Video Coding (JCT-VC). In HEVC, one slice is partitioned into multiple coding tree units (CTU). In main profile, the minimum and the maximum sizes of CTU are specified by the syntax elements in the sequence parameter set (SPS). The allowed CTU size can be 8×8, 16×16, 32×32, or 64×64. For each slice, the CTUs within the slice are processed according to a raster scan order.

The CTU is further partitioned into multiple coding units (CU) to adapt to various local characteristics. A CTU can be further partitioned into multiple Coding Units (CUs) through Quad-Tree or Quadtree (QT) partitioning. The QT partition splits a block of size 4N×4N into 4 equal-size 2N×2N sub-blocks. The CTU can be a single CU (i.e., no splitting) or can be split into four smaller units of equal size, which correspond to the nodes of the coding tree. If units are leaf nodes of the coding tree, the units become CUs. Otherwise, the quadtree splitting process can be iterated until the size for a node reaches a minimum allowed CU size as specified in the SPS (Sequence Parameter Set).

According to HEVC, each CU can be partitioned into one or more prediction units (PU). Coupled with the CU, the PU works as a basic representative block for sharing the prediction information. Inside each PU, the same prediction process is applied and the relevant information is transmitted to the decoder on a PU basis. A CU can be split into one, two or four PUs according to the PU splitting type. HEVC defines eight shapes for splitting a CU into PU, including 2N×2N, 2N×N, N×2N, N×N, 2N×nU, 2N×nD, nL×2N and nR×2N partition types. Unlike the CU, the PU may only be split once according to HEVC.

After obtaining the residual block by the prediction process based on PU splitting type, the prediction residues of a CU can be partitioned into transform units (TU) according to another quadtree structure which is analogous to the coding tree for the CU. The TU is a basic representative block having residual or transform coefficients for applying the integer transform and quantization. For each TU, one integer transform having the same size as the TU is applied to obtain residual coefficients. These coefficients are transmitted to the decoder after quantization on a TU basis.

FIG. 1 illustrates an exemplary adaptive Inter/Intra video coding system incorporating transform and quantization to process prediction residues. For Inter-prediction, Motion Estimation (ME)/Motion Compensation (MC) 112 is used to provide prediction data based on video data from other picture or pictures. Switch 114 selects Intra Prediction 110 or Inter-prediction data and the selected prediction data is supplied to Adder 116 to form prediction errors, also called residues. The prediction error is then processed by Transform (T) 118 followed by Quantization (Q) 120. The transformed and quantized residues are then coded by Entropy Encoder 122 to be included in a video bitstream corresponding to the compressed video data. The bitstream associated with the transform coefficients is then packed with side information such as motion, coding modes, and other information associated with the image area. The side information may also be compressed by entropy coding to reduce required bandwidth. Accordingly, the data associated with the side information are provided to Entropy Encoder 122 as shown in FIG. 1. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1, incoming video data undergoes a series of processing in the encoding system. The reconstructed video data from REC 128 may be subject to various impairments due to a series of processing. Accordingly, Loop filter 130 is often applied to the reconstructed video data before the reconstructed video data are stored in the Reference Picture Buffer 134 in order to improve video quality. For example, de-blocking filter (DF) and Sample Adaptive Offset (SAO) have been used in the High Efficiency Video Coding (HEVC) standard. The loop filter may also include ALF (Adaptive Loop Filter). The loop filter information may have to be incorporated in the bitstream so that a decoder can properly recover the required information. Therefore, loop filter information is provided to Entropy Encoder 122 for incorporation into the bitstream. In FIG. 1, Loop filter 130 is applied to the reconstructed video before the reconstructed samples are stored in the reference picture buffer 134. The system in FIG. 1 is intended to illustrate an exemplary structure of a typical video encoder. It may correspond to the High Efficiency Video Coding (HEVC) system or H.264.

FIG. 2 illustrates a system block diagram of a corresponding video decoder for the encoder system in FIG. 1. Since the encoder also contains a local decoder for reconstructing the video data, some decoder components are already used in the encoder except for the entropy decoder 210. Furthermore, only motion compensation 220 is required for the decoder side. The switch 146 selects Intra-prediction or Inter-prediction and the selected prediction data are supplied to reconstruction (REC) 128 to be combined with recovered residues. Besides performing entropy decoding on compressed residues, entropy decoding 210 is also responsible for entropy decoding of side information and provides the side information to respective blocks. For example, Intra mode information is provided to Intra-prediction 110, Inter mode information is provided to motion compensation 220, loop filter information is provided to loop filter 130 and residues are provided to inverse quantization 124. The residues are processed by IQ 124, IT 126 and subsequent reconstruction process to reconstruct the video data. Again, reconstructed video data from REC 128 undergo a series of processing including IQ 124 and IT 126 as shown in FIG. 2 and are subject to coding artefacts. The reconstructed video data are further processed by Loop filter 130.

Default Quantization Matrices Representation

The quantization matrix (QM) has been used in various video coding standards. For example, the quantization matrix is used for the quantization 120 in FIG. 1 and the inverse quantization 124 in FIG. 2. Block-based hybrid video coding schemes which imply transform coding of the residual signal can use frequency dependent scaling to control the distribution of the quantization distortion across different frequencies in a transform unit (TU). In order to achieve perceptually uniform quantization across spatial frequencies, a quantization matrix can be designed to weight each frequency channel associated with the transform coefficient according to the perceived sensitivity over its related frequency range. Accordingly, low frequency coefficients in the transform block will be quantized with a finer quantization step size compared to high frequency coefficients. The corresponding quantization matrix can be employed to inversely weight de-quantized transform coefficients at the decoder.

Quantization matrix has been successfully utilized in video coding standards, such as H.264/AVC and H.265/HEVC (High Efficiency Video Coding), which allows to improve the subjective quality of video content. Due to their effectiveness, quantization matrices have been widely used in numerous video coding products.

The HEVC specification includes four integer inverse transform matrices of sizes 4×4, 8×8, 16×16, and 32×32. These transform matrices are integer approximations of the DCT-2 matrix of the same size, aiming at the preservation of the DCT (discrete cosine transform) coefficient structure. An additional 4×4 DST (discrete sine transform) matrix is specified which is applied to the residual of Intra predicted 4×4 blocks. For distinction from the DST, the four DCTs are referred to as the HEVC core transforms.

Quantization matrix is being evaluated for adoption in the emerging new video coding standard, named VVC (Versatile Video Coding) as a next generation video coding standard and a successor to H.265/HEVC. The quantization matrix is also called scaling matrix in this disclosure.

When frequency dependent scaling is enabled, the quantization matrices of sizes 4×4 and 8×8 have default values as shown in FIG. 3. As shown in FIG. 3, 4×4 matrix 310 is used for luma and chroma components in the Intra and Inter modes, 8×8 matrix 320 is used for luma and chroma components in the Intra mode, and 8×8 matrix 330 is used for luma and chroma components in the Inter mode.

For example, the following 20 quantization matrices are supported for different sizes and types of the transform block:

Luma: Intra4×4, Inter4×4, Intra8×8, Inter8×8, Intra16×16, Inter16×16, Intra32×32, Inter32×32

Cb: Intra4×4, Inter4×4, Intra8×8, Inter8×8, Intra16×16, Inter16×16

Cr: Intra4×4, Inter4×4, Intra8×8, Inter8×8, Intra16×16, Inter16×16

In order to reduce the memory needed to store the quantization matrices, 8×8 matrices are used to generate 16×16 and 32×32 quantization matrices. The default quantization matrices for transform blocks of size 16×16 and 32×32 are obtained from the default 8×8 quantization matrices of the same type by up-sampling using replication. This procedure is shown in FIG. 4: the dot-filled block 412 in the figure indicate that a quantization matrix entry in the 8×8 quantization matrix 410 is replicated into a 2×2 region 422 in the 16×16 quantization matrix 420 and into a 4×4 region 432 in the 32×32 quantization matrix 430.

Luma Mapping and Chroma Scaling (LMCS)

The Versatile Video Coding (VVC) is an emerging video coding standard being developed by the Joint Video Experts Team, a collaborative team formed by the ITU-T Study Group 16 Video Coding Experts Group and ISO/IEC JTC1 SC29/WG11 (Moving Picture Experts Group, MPEG). The VVC is based on the HEVC (High Efficiency Video Coding) video standard with improved and new coding tools. For example, reshaping process is a new coding tool adopted in VTM-4.0 (VVC Test Model Ver. 4.0). The reshaping process is also referred as LMCS (Luma Mapping and Chroma Scaling). When reshaping is applied, the video samples are coded and reconstructed in the reshaped domain before loop filtering. The reshaped-domain reconstructed samples are converted to the original domain by using the inverse reshaping. The loop-filtered original-domain reconstructed samples are stored in the decoded picture buffer. For Inter mode, the motion compensated (MC) predictors are converted to the reshaped domain by using the forward reshaping. FIG. 5 shows the example of reshaping process at a decoder side.

As shown in FIG. 5, the bitstream is processed by CABAC (context-adaptive binary arithmetic coding) decoder 510 (i.e., CABAC$^{-1}$), inverse quantization (i.e., $Q^{-1}$) and inverse transform ($T^{-1}$) to derive reconstructed luma residue $Y_{res}$. The reconstructed luma residue is provided to the luma reconstruction block 520 to generate reconstructed luma signal. For Intra mode, the predictor comes from the Intra prediction block 530. For Inter mode, the predictor comes from the motion compensation block 540. Since reshaping is applied to the luma signal at the encoder side, the forward reshaping 550 is applied the predictor from the motion compensation block 540 before the predictor is provided to the reconstruction block 520. The inverse reshaping 560 is applied to the reconstructed luma signal from the reconstruction block 520 to recover the un-shaped reconstructed luma signal. Loop filter 570 is then applied to the un-shaped reconstructed luma signal before the signal is stored in the decoded picture buffer (DPB) 580.

BRIEF SUMMARY OF THE INVENTION

A method and apparatus for coding a video sequence, wherein a subpicture coding mode is included, are disclosed. According to the present invention, a bitstream corresponding to encoded data of the video sequence is generated at an encoder side or received at a decoder side, where the bitstream comprises a first syntax and a second syntax, the first syntax corresponds to a target number of bits used to represent a set of third syntaxes and each third syntax specifies one subpicture ID for one subpicture in a set of subpictures, and the second syntax corresponds to a total number of subpictures in the set of subpicture, and where a computation made to a first value of the first syntax is equal to or greater than a second value of the second syntax. The video sequence is encoded, at the encoder side, or decoded, at the decoder side, based on information comprising the set of subpictures.

In one embodiment, the first syntax and the second syntax are signaled, at the encoder side, or parsed, at the decoder side, in sequence parameter set (SPS). In another embodiment, the first syntax and the second syntax are signaled, at the encoder side, or parsed, at the decoder side, in sequence parameter set (SPS), picture parameter set (PPS), slice header (SH), picture header (PH) or a combination thereof.

In one embodiment, the first syntax corresponds to the target number of bits minus 1. In one example, the first syntax is in sequence parameter set (SPS) and designated as sps_subpic_id_len_minus1 for representing the target number of bits minus 1. In another example, the first number that can be represented by the target number of bits corresponds to (1<<((the target number of bits minus 1)+1), and wherein "<<" represents an arithmetic left shift operation. In another example, the second syntax is in sequence parameter set (SPS) and designated as sps_num_subpic_minus1 for representing the total number of subpictures in the set of subpicture minus 1.

In one embodiment, the first syntax corresponds to the target number of bits minus an offset and plus a first value, and wherein the first value corresponds to Ceil(Log 2 (the total number of subpictures)), and wherein "Ceil" is a ceiling function and "Log 2" is a log-base-2 function.

Another method and apparatus for coding a video sequence, wherein a subpicture coding mode is included, are disclosed. According to the present invention, a bitstream corresponding to encoded data of the video sequence is generated at an encoder side or received at a decoder side, where the bitstream comprises a set of subpicture ID syntaxes and each subpicture ID syntax specifies one subpicture ID for one subpicture in a set of subpictures, and wherein a first subpicture ID syntax for a first subpicture has a different value from a second subpicture ID syntax for a second subpicture if the first subpicture is different from the second subpicture. The video sequence is encoded, at the encoder side, or decoded, at the decoder side, based on information comprising the set of subpictures.

In one embodiment, the bitstream satisfies a bitstream conformance requirement that the first subpicture ID syntax for the first subpicture is different the second subpicture ID syntax for the second subpicture if the first subpicture is different from the second subpicture. In another embodiment, the set of subpicture ID syntaxes are signaled, at the encoder side, or parsed, at the decoder side, in sequence parameter set (SPS), picture parameter set (PPS), slice header (SH), picture header (PH) or a combination thereof.

BRIEF DESCRIPTION OF THE DRAWINGS

FIG. 3 illustrates examples of 4×4 and 8×8 shared based base scaling matrices for deriving larger scaling matrices for luma and chroma components in the Intra and Inter coding modes.

FIG. 4 illustrates an example of deriving the quantization matrices for transform blocks of size 16×16 and 32×32 from a shared based 8×8 quantization matrix of the same type by up-sampling using replication.

DETAILED DESCRIPTION OF THE INVENTION

Figure 1:
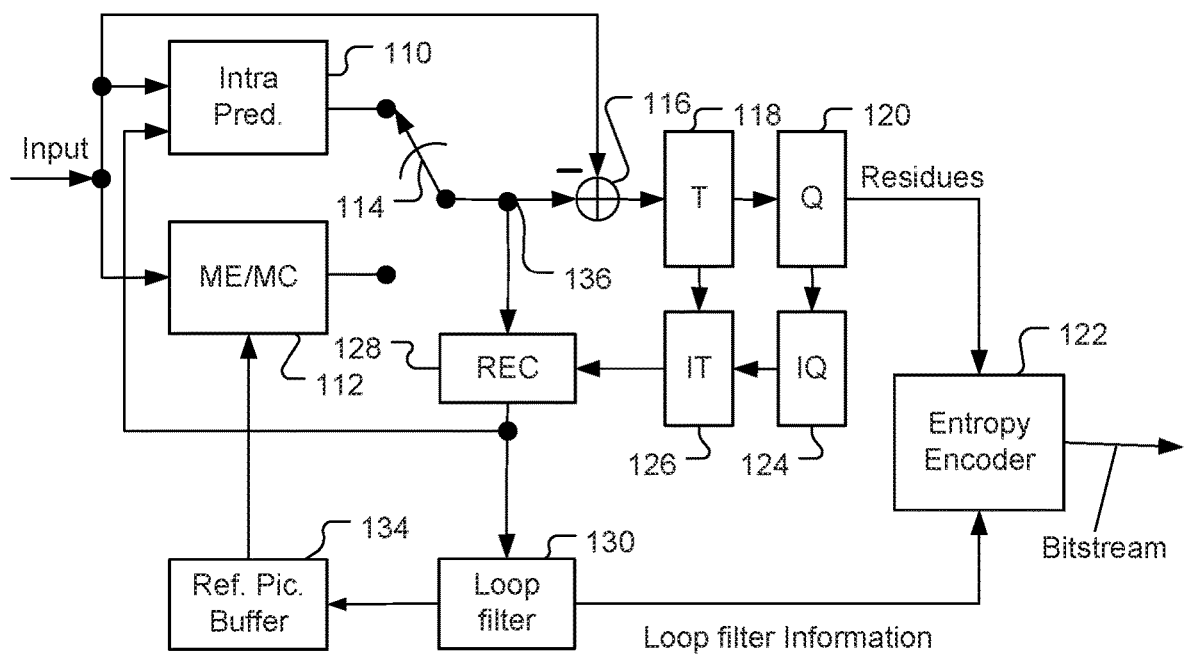
FIG. 1 illustrates an exemplary block diagram of a video encoder, where the video encoder incorporates Intra/Inter prediction, transform and quantization processes.
Figure 2:
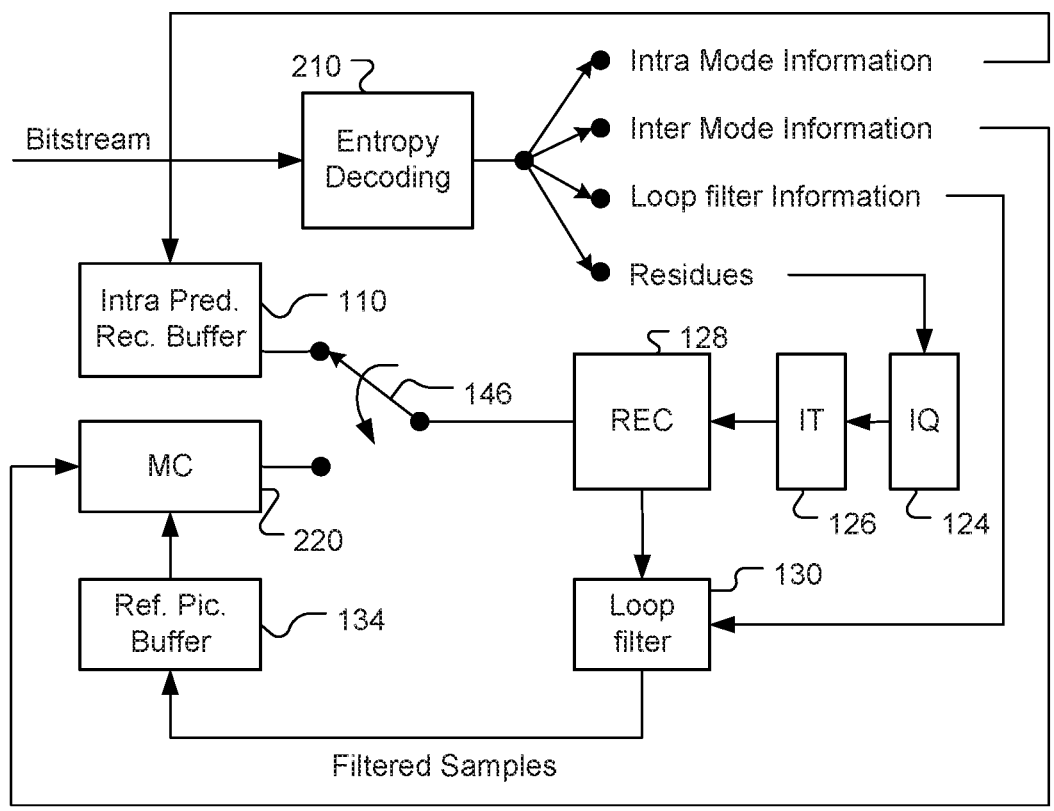
FIG. 2 illustrates an exemplary block diagram of a video decoder, where the video decoder incorporates Intra/Inter prediction, inverse transform and de-quantization processes.
Figure 5:
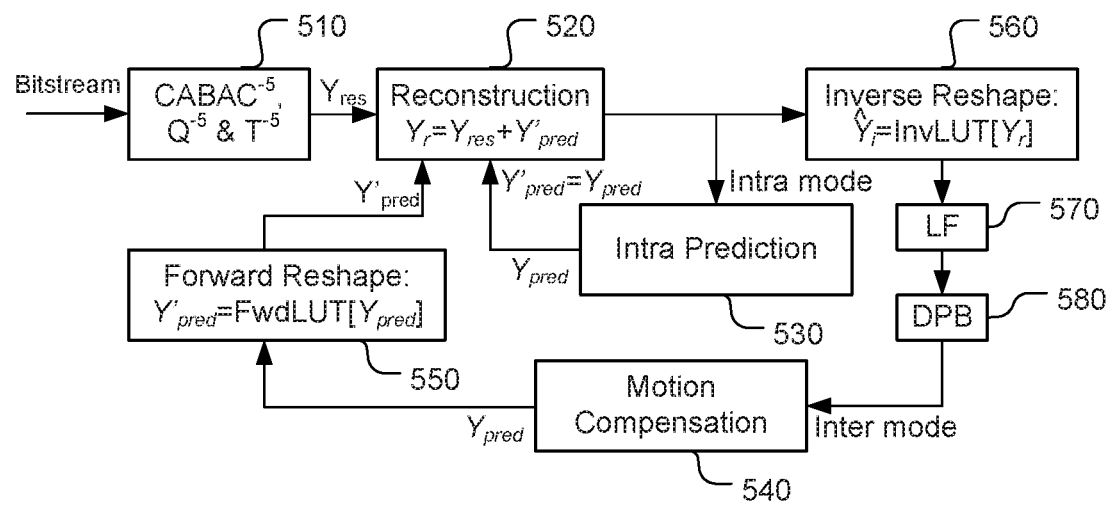
FIG. 5 illustrates an exemplary block diagram of a video decoder incorporating luma reshaping process.

The following description is of the best-contemplated mode of carrying out the invention. This description is made for the purpose of illustrating the general principles of the invention and should not be taken in a limiting sense. The scope of the invention is best determined by reference to the appended claims.

Signaling of Subpicture Information

In VVC Draft 7 standard, JVET-P2001 (B. Bross, et al., "Versatile Video Coding (Draft 7)", Joint Video Experts Team (JVET) of ITU-T SG 16 WP 3 and ISO/IEC JTC 1/SC 29/WG 11, 16th Meeting: Geneva, CH, 1-11 Oct. 2019, Document: JVET-P2001-vB), subpicture coding is support. Information regarding subpictures is signaled in the bitstream including SPS (Sequence Parameter Set) and PPS (Picture Parameter Set).

According to JVET-P2001, the signaling of subpicture information in the SPS is shown in Table 1.

TABLE 1

| Signaling of subpicture information in SPS | |
|---|---|
| ... | |
| subpics_present_flag | u(1) |
| if( subpics_present_flag ) { | |
|    sps_num_subpics_minus1 | u(8) |
|    for( i = 0; i <= sps_num_subpics_minus1; i++ ) { | |
|       subpic_ctu_top_left_x[ i ] | u(v) |
|       subpic_ctu_top_left_y[ i ] | u(v) |
|       subpic_width_minus1[ i ] | u(v) |
|       subpic_height_minus1[ i ] | u(v) |
|       subpic_treated_as_pic_flag[ i ] | u(1) |
|       loop_filter_across_subpic_enabled_flag[ i ] | u(1) |
|    } | |
| } | |
| sps_subpic_id_present_flag | u(1) |
| if( sps_subpics_id_present_flag ) { | |
|    sps_subpic_id_signalling_present_flag | u(1) |
|    if( sps_subpics_id_signalling_present_flag ) { | |
|       sps_subpic_id_len_minus1 | ue(v) |
|       for( i = 0; i <= sps_num_subpics_minus1; i++ ) | |
|          sps_subpic_id[ i ] | u(v) |
|    } | |
| } | |
| ... | |

In the above table, subpics_present_flag equal to 1 specifies that subpicture parameters are present in in the SPS RBSP syntax. subpics_present_flag equal to 0 specifies that subpicture parameters are not present in the SPS RBSP syntax.

NOTE 2—When a bitstream is the result of a sub-bitstream extraction process and contains only a subset of the subpictures of the input bitstream to the sub-bitstream extraction process, it might be required to set the value of subpics_present_flag equal to 1 in the RBSP of the SPSs.

sps_num_subpics_minus1 plus 1 specifies the number of subpictures. sps_num_subpics_minus1 shall be in the range of 0 to 254. When not present, the value of sps_num_subpics_minus1 is inferred to be equal to 0.

sps_subpic_id_present_flag equal to 1 specifies that subpicture ID mapping is present in the SPS. sps_subpic_id_present_flag equal to 0 specifies that subpicture ID mapping is not present in the SPS.

sps_subpic_id_signalling_present_flag equal to 1 specifies that subpicture ID mapping is signalled in the SPS. sps_subpic_id_signalling_present_flag equal to 0 specifies that subpicture ID mapping is not signalled in the SPS. When not present, the value of sps_subpic_id_signalling_present_flag is inferred to be equal to 0.

sps_subpic_id_len_minus1 plus 1 specifies the number of bits used to represent the syntax element sps_subpic_id[i]. The value of sps_subpic_id_len_minus1 shall be in the range of 0 to 15, inclusive.

sps_subpic_id[i] specifies that subpicture ID of the i-th subpicture. The length of the sps_subpic_id[i] syntax element is sps_subpic_id_len_minus1+1 bits. When not present, and when sps_subpic_idpresent flag equal to 0, the value of sps_subpic_id[i] is inferred to be equal to i, for each i in the range of 0 to sps_num_subpics_minus1, inclusive According to JVET-P2001, the signaling of subpicture information in the PPS is shown in Table 2.

TABLE 2

Signaling of subpicture information in PPS

| | |
|---|---|
| ... | |
| pps_subpic_id_signalling_present_flag | u(1) |
| if( pps_subpics_id_signalling_present_flag ) { | |
|     pps_num_subpics_minus1 | ue(v) |
|     pps_subpic_id_len_minus1 | ue(v) |
|     for( i = 0; i <= pps_num_subpic_minus1; i++ ) | |
|         pps_subpic_id[ i ] | u(v) |
| } | |
| ... | | pps_subpic_id_len_minus1 plus 1 specifies the number of bits used to represent the syntax element pps_subpic_id[i]. The value of pps_subpic_id_len_minus1 shall be in the range of 0 to 15, inclusive.

It is a requirement of bitstream conformance that the value of pps_subpic_id_len_minus1 shall be the same for all PPSs that are referred to by coded pictures in a CLVS (coded layer video sequence).

pps_subpic_id[i] specifies that subpicture ID of the i-th subpicture. The length of the pps_subpic_id[i] syntax element is pps_subpic_id_len_minus1+1 bits.

According to JVET-P2001, the signaling of subpicture information in the Picture Header (PH) is shown in Table 3.

TABLE 3

Signaling of subpicture information in PH

| | |
|---|---|
| if( sps_subpic_id_present_flag && | |
| !sps_subpic_id_signalling_flag ) { | |
|     ph_subpic_id_signalling_present_flag | u(1) |
|     if( ph_subpics_id_signalling_present_flag ) { | |

TABLE 3-continued

Signaling of subpicture information in PH

| | |
|---|---|
|         ph_subpic_id_len_minus1 | ue(v) |
|         for( i = 0; i <= sps_num_subpics_minus1; i++ ) | |
|             ph_subpic_id[ i ] | u(v) |
|     } | |
| } | | ph_subpic_id_signalling_present_flag equal to 1 specifies that subpicture ID mapping is signalled in the PH. ph_subpic_id_signalling_present_flag equal to 0 specifies that subpicture ID mapping is not signalled in the PH.

ph_subpic_id_len_minus1 plus 1 specifies the number of bits used to represent the syntax element ph_subpic_id[i]. The value of pic_subpic_id_len_minus1 shall be in the range of 0 to 15, inclusive.

It is a requirement of bitstream conformance that the value of ph_subpic_id_len_minus1 shall be the same for all PHs that are referred to by coded pictures in a CLVS.

ph_subpic_id[i] specifies that subpicture ID of the i-th subpicture. The length of the ph_subpic_id[i] syntax element is ph_subpic_id_len_minus1+1 bits.

The list SubpicIdList[i] is derived as follows:
for (i=0; i<=sps_num_subpics_minus1; i++)
SubpicIdList[i]=sps_subpic_id_present_flag?
  (sps_subpic_id_signalling_present_flag?sps_subpic_id[i]:
  (ph_subpic_id_signalling_present_flag?ph_subpic_id[i]:
    pps_subpic_id[i])): i While VVC Draft 7 standard specifies the number of bits (e.g., sps_subpic_id_len_minus1 plus 1) used to represent the syntax element sps_subpic_id[i] and the total number of subpictures (e.g., sps_num_subpics_minus1+1), the standard does not address the issue that every subpicture requires its own ID to distinguish among various subpictures. According, the present invention discloses a method solve this issue.

Method 1: Signaling Constraint of Subpicture Information According to One Embodiment of the Present Invention In order to over come this issue, signaling of subpicture information is proposed according to present invention. One embodiment of the signaling of the subpicture information is based on Table 2.

According to JVET-P2001, a syntax, i.e. sps_subpic_id_len_minus1 is signaled in SPS to indicate the number of bits used to represent the syntax element sps_subpic_id[i]. Also, a syntax, sps_num_subpics_minus1 plus 1 specifies the number of subpictures. In one embodiment of the present invention, the range of sps_subpic_id_len_minus1 shall be further constrained based on the value of sps_num_subpics_minus1. For example, the value of (1<<(sps_subpic_id_len_minus1 plus 1)) should be greater than or equal to (sps_num_subpics_minus1 plus 1), where "<<" corresponds to arithmetic left shift operation, 1<<x corresponds to 2-to-the-power of x and x is an integer. For another example, the value of sps_subpic_id_len_minus1 should be greater than or equal to Ceil(Log 2(sps_num_subpics_minus1 plus))−1, where Ceil( ) corresponds to the ceiling function and Ceil(x) represents the smallest integer greater than or equal to x.

In another embodiment, the same constraints shall be applied to pps_subpic_id_len_minus1 in PPS. For example, the value of (1<<(pps_subpic_id_len_minus1 plus 1))

should be greater than or equal to (pps_num_subpics_minus1 plus 1). In another embodiment, the same constraints shall be applied to ph_subpic_id_len_minus1 in PH. For example, the value of (1<<(ph_subpic_id_len_minus1 plus 1)) should be greater than or equal to (ph_num_subpics_minus1 plus 1).

Signaling Partition Information for Color Video

In JVET-P2001, partition information for color video is also signaled in SPS as shown in Table 4.

TABLE 4

Signaling partition information for color video in SPS

| | |
|---|---|
| ... | |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_log2_diff_min_qt_min_cb_inter_slice | ue(v) |
| sps_max_mtt_hierarchy_depth_inter_slice | ue(v) |
| sps_max_mtt_hierarchy_depth_intra_slice_luma | ue(v) |
| if( sps_max_mtt_hierarchy_depth_intra_slice_luma != 0 ) { | |
|   sps_log2_diff_max_bt_min_qt_intra_slice_luma | ue(v) |
|   sps_log2_diff_max_tt_min_qt_intra_slice_luma | ue(v) |
| } | |
| if( sps_max_mtt_hierarchy_depth_inter_slice != 0 ) { | |
|   sps_log2_diff_max_bt_min_qt_inter_slice | ue(v) |
|   sps_log2_diff_max_tt_min_qt_inter_slice | ue(v) |
| } | |
| if( qtbtt_dual_tree_intra_flag ) { | |
|   sds_log2_diff_min_qt_min_cb_intra_slice_chroma | ue(v) |
|   sps_max_mtt_hierarchy_depth_intra_slice_chroma | ue(v) |
|   if( sps_max_mtt_hierarchy_depth_intra_slice_chroma != 0 ) { | |
|     sps_log2_diff_max_bt_min_qt_intra_slice_chroma | ue(v) |
|     sps_log2_diff_max_tt_min_qt_intra_slice_chroma | ue(v) |
|   } | |
| } | | sps_log 2_diff_min_qt_min_cb_intra_slice_luma specifies the default difference between the base-2 logarithm of the minimum size in luma samples of a luma leaf block resulting from quadtree splitting of a CTU and the base-2 logarithm of the minimum coding block size in luma samples for luma CUs in slices with slice_type equal to 2 (i.e., I frame) referring to the SPS. When partition_constraints_override_enabled_flag is equal to 1, the default difference can be overridden by pic_log 2_diff_min_qt_min_cb_luma present in PHs referring to the SPS. The value of sps_log 2_diff_min_qt_min_cb_intra_slice_luma shall be in the range of 0 to CtbLog2SizeY−MinCbLog2SizeY, inclusive. The base-2 logarithm of the minimum size in luma samples of a luma leaf block resulting from quadtree splitting of a CTU is derived as follows:

MinQtLog2SizeIntraY=sps_log 2_diff_min_qt_min_cb_intra_slice_luma+MinCbLog2SizeY.

sps_log 2_diff_min_qt_min_cb_inter_slice specifies the default difference between the base-2 logarithm of the minimum size in luma samples of a luma leaf block resulting from quadtree splitting of a CTU and the base-2 logarithm of the minimum luma coding block size in luma samples for luma CUs in slices with slice_type equal to 0 (i.e., B frame) or 1 (i.e., P frame) referring to the SPS. When partition_constraints_override_enabled_flag is equal to 1, the default difference can be overridden by pic_log 2_diff_min_qt_min_cb_luma present in PHs referring to the SPS. The value of sps_log 2_diff_min_qt_min_cb_inter_slice shall be in the range of 0 to CtbLog2SizeY−MinCbLog2SizeY, inclusive. The base-2 logarithm of the minimum size in luma samples of a luma leaf block resulting from quadtree splitting of a CTU is derived as follows:

MinQtLog2SizeInterY=sps_log 2_diff_min_qt_min_cb_inter_slice+MinCbLog2SizeY.

sps_max_mtt_hierarchy_depth_inter_slice specifies the default maximum hierarchy depth for coding units resulting from multi-type tree splitting of a quadtree leaf in slices with slice_type equal to 0 (B) or 1 (P) referring to the SPS. When partition_constraints_override_enabled_flag is equal to 1, the default maximum hierarchy depth can be overridden by pic_max_mtt_hierarchy_depth_inter_slice present in PHs referring to the SPS. The value of sps_max_mtt_hierarchy_depth_inter_slice shall be in the range of 0 to 2*(CtbLog2SizeY−MinCbLog2SizeY), inclusive.

sps_max_mtt_hierarchy_depth_intra_slice_luma specifies the default maximum hierarchy depth for coding units resulting from multi-type tree splitting of a quadtree leaf in slices with slice_type equal to 2 (I) referring to the SPS. When partition_constraints_override_enabled_flag is equal to 1, the default maximum hierarchy depth can be overridden by pic_max_mtt_hierarchy_depth_intra_slice_luma present in PHs referring to the SPS. The value of sps_max_mtt_hierarchy_depth_intra_slice_luma shall be in the range of 0 to 2*(CtbLog2SizeY−MinCbLog2SizeY), inclusive.

Method 2: Signaling Partition Information for Color Video According to One Embodiment of the Present Invention According to one embodiment of the present invention, a syntax, i.e. sps_log 2_diff_min_qt_min_cb_intra_slice_luma, is signaled in SPS to specify the default difference between the base-2 logarithm of the minimum size in luma samples of a luma leaf block resulting from quadtree splitting of a CTU and the base-2 logarithm of the minimum coding block size in luma samples for luma CUs in slices with slice_type equal to 2 (i.e., I frame) referring to the SPS. sps_log 2_diff_min_qt_min_cb_inter_slice is signaled in SPS to specify the default difference between the base-2 logarithm of the maximum size (width or height) in luma samples of a luma coding block that can be split using a ternary split and the minimum size (width or height) in luma samples of a luma leaf block resulting from quadtree splitting of a CTU in slices with slice_type equal to 0 (i.e., B frame) or 1 (i.e., P frame) referring to the SPS.

If MTT (Multiple Transform Type) is not allowed, i.e. either sps_max_mtt_hierarchy_depth_intra_slice_luma or sps_max_mtt_hierarchy_depth_inter_slice_luma is equal to 0, the minimum size in luma samples of a luma leaf block resulting from quadtree splitting of a CTU can be inferred to the minimum coding block size in luma samples for luma CUs. In this way, sps_log 2_diff_min_qt_min_cb_intra_slice_luma and sps_log 2_diff_min_qt_min_cb_inter_slice are no needed to be signaled. In one embodiment, sps_log 2_diff_min_qt_min_cb_intra_slice_luma and sps_log 2_diff_min_qt_min_cb_inter_slice can be signaled after sps_max_mtt_hierarchy_depth_intra_slice_luma and sps_max_mtt_hierarchy_depth_inter_slice. Only when sps_max_mtt_hierarchy_depth_intra_slice_luma is not equal to zero, sps_log 2_diff_min_qt_min_cb_intra_slice_luma will be signaled. Otherwise, it is inferred to be zero. And only when sps_max_mtt_hierarchy_depth_inter_slice is not equal to zero, sps_log 2_diff_min_qt_min_cb_inter_slice will be signaled. Otherwise, it is inferred to be zero. Moreover, the above embodiment can be extended to chroma syntax, i.e. sps_log 2_diff_min_qt_min_cb_intra_slice_chroma.

The signaling of partition information for color video according to one embodiment of the present invention is shown in Table 5.

TABLE 5

Signaling partition information for color video in SPS according to one embodiment of the present invention

| | |
|---|---|
| //sps_log2_diff_min_qt_min_cb_intra_slice_luma// | //ue(v)// |
| // sps_log2_diff_min_qt_min_cb_inter_slice// | //ue(v)// |
| sps_max_mtt_hierarchy_depth_inter_slice | ue(v) |
| sps_max_mtt_hierarchy_depth_intra_slice_luma | ue(v) |
| if( sps_max_mtt_hierarchy_depth_intra_slice_luma != 0 ) { | |
|     sps_log2_diff_min_qt_min_cb_intra_slice_luma | ue(v) |
|     sps_log2_diff_max_bt_min_qt_intra_slice_luma | ue(v) |
|     sps_log2_diff_max_tt_min_qt_intra_slice_luma | ue(v) |
| } | |
| if( sps_max_mtt_hierarchy_depth_inter_slice != 0 ) { | |
|     sps_log2_diff_min_qt_min_cb_inter_slice | ue(v) |
|     sps_log2_diff_max_bt_min_qt_inter_slice | ue(v) |
|     sps_log2_diff_max_tt_min_qt_inter_slice | ue(v) |
| } | |
| if( qtbtt_dual_tree_intra_flag ) { | |
|   // sps_log2_diff_min_qt_min_cb_intra_slice_chroma// | //ue(v)// |
|   sps_max_mtt_hierarchy_depth_intra_slice_chroma | ue(v) |
|   if( sps_max_mtt_hierarchy_depth_intra_slice_chroma != 0 ) { | |
|     sps_log2_diff_min_qt_min_cb_intra_slice_chroma | ue(v) |
|     sps_log2_diff_max_bt_min_qt_intra_slice_chroma | ue(v) |
|     sps_log2_diff_max_tt_min_qt_intra_slice_chroma | ue(v) |
|   } | |
| } | |

The above syntax table is designed based on the conventional syntax table in Table 4, where texts within a pair of double slashes (i.e., "//") indicate deleted texts and texts in Italic style indicate inserted texts.

Signaling Syntax of LMCS, and Scaling List in APS and PH

In JVET-P2001, signaling syntax of LMCS, and scaling list in APS and PH is shown in Table 6 and Table 7 respectively.

TABLE 6

Signaling syntax of LMCS and scaling list data in APS

| | Descriptor |
|---|---|
| adaptation_parameter_set_rbsp( ) { | |
|   adaptation_parameter_set_id | u(5) |
|   aps_params_type | u(3) |
|   if( aps_params_type = = ALF_APS ) | |
|     alf_data( ) | |
|   else if( aps_params_type = = LMCS_APS ) | |
|     lmcs_data( ) | |
|   else if( aps_params_type = = SCALING_APS ) | |
|     scaling_list_data( ) | |
|   aps_extension_flag | u(1) |
|   if( aps_extension_flag ) | |
|     while( more_rbsp_data( ) ) | |
|       aps_extension_data_flag | u(1) |
|   rbsp_trailing_bits( ) | |
| } | |

TABLE 7

Signaling syntax of LMCS and scaling list data in PH

| | |
|---|---|
| ... | |
| if( sps_lmcs_enabled_flag ) { | |
|   pic_lmcs_enabled_flag | u(1) |
|   if( pic_lmcs_enabled_flag ) { | |
|     pic_lmcs_aps_id | u(2) |
|     if( ChromaArrayType != 0 ) | |
|       pic_chroma_residual_scale_flag | u(1) |
|   } | |
| } | |
| if( sps_scaling_list_enabled_flag ) { | |

TABLE 7-continued

Signaling syntax of LMCS and scaling list data in PH

| | |
|---|---|
|   pic_scaling_list_present_flag | u(1) |
|   if( pic_scaling_list_present_flag ) | |
|     pic_scaling_list_aps_id | u(3) |
| } | |

Method 3: Signaling Partition Information for Color Video According to One Embodiment of the Present Invention The syntax of LMCS, and scaling list are signaled in APS and PH. To make the syntax signaling more flexible, in one embodiment, a pic_lmcs_enabled_present_flag is signaled before pic_lmcs_enabled_flag in PH to indicate whether LMCS information, i.e. pic_lmcs_aps_id, or pic_chroma_residual_scale_flag, is signaled in PH or not. If pic_lmcs_enabledpresent_flag is enabled, pic_lmcs_enabled_flag will be signaled as well as pic_lumc_aps_id, pic_lmcs_aps_id, and pic_chroma_residual_scale_flag are signaled. Otherwise, (if pic_lmcs_enabledpresent_flag is false), no LMCS related syntax is needed to be signaled in PH. In another embodiment, LMCS syntax can be signaled in the slice header to further increase the flexibility of LMCS. For example, if sps_lmcs_enabled_flag is enabled and pic_lmcs_enabledpresent_flag is false, slice_lmcs_enabled_flag will be signaled. Furthermore, if slice_lmcs_enabled_flag is true, the other LMCS related syntax, i.e. slice_lumc_aps_id, slice_lmcs_aps_id, and slice_chroma_residual_scale_flag will be signaled. In another embodiment, if sps_lmcs_enabled_flag is enabled, slice_lmcs_enabled_flag will be signaled regardless of pic_lmcs_enabledpresent_flag. Furthermore, the LMCS parameters signaled in the slice header can overwrite the LMCS parameters signaled in PH.

TABLE 8

Signaling syntax of LMCS data in PH according to one embodiment of the present invention

| |
|---|
| if( sps_lmcs_enabled_flag ) { |
|     pic_lmcs_enabled_present_flag |
|     if (pic_lmcs_enabled_present_flag) { |
|         pic_lmcs_enabled_flag     u(1) |
|         if( pic_lmcs_enabled_flag ) { |
|             pic_lmcs_aps_id     u(2) |
|             if( ChromaArrayType != 0 ) |
|                 pic_chroma_residual_scale_flag     u(1) |
|         } |
|     } |
| } |

TABLE 9

Signaling syntax of LMCS data in Slice Header according to one embodiment of the present invention

| |
|---|
| if(sps_lmcs_enabled_flag && ! pic_lmcs_enabled_present_flag) { |
|     slice_lmcs_enabled_flag |
|     if(slice_lmcs_enabled_flag) { |
|         slice_lmcs_aps_id |
|         if( ChromaArrayType != 0 ) |
|             slice_chroma_residual_scale_flag |
|     } |
| } | pic_lmcs_enabled_present_flag equal to 1 specifies that pic_lmcs_enabled_flag, pic_lmcs_aps_id, and pic_chroma_residual_scale_flag are present in the PH. pic_lmcs_enabledpresent_flag equal to 0 specifies that pic_lmcs_enabled_flag, pic_lmcs_aps_id and pic_chroma_residual_scale_flag are not present in the PH. When pic_lmcs_enabledpresent_flag is not present, it is inferred to be equal to 0.

slice_lmcs_enabled_flag equal to 1 specifies that luma mapping with chroma scaling is enabled in a slice. slice_lmcs_enabled_flag equal to 0 specifies that luma mapping with chroma scaling is disabled in a slice. When not present, the value of slice_lmcs_enabled_flag is inferred to be equal to pic_lmcs_enabled_flag.

slice_lmcs_aps_id specifies the adaptation_parameter_set_id of the LMCS APS that the slice refers to. The TemporalId of the APS NAL unit having aps_params_type equal to LMCS_APS and adaptation_parameter_set_id equal to slice_lmcs_aps_id shall be less than or equal to the TemporalId of the coded slice NAL unit. When slice_lmcs_enabled_flag is equal to 1 and slice_lmcs_aps_id is not present, the value of slice_lmcs_aps_id is inferred to be equal to the value of pic_lmcs_aps_id.

slice_chroma_residual_scale_flag equal to 1 specifies that chroma residual scaling is enabled for the slice. slice_chroma_residual_scale_flag equal to 0 specifies that chroma residual scaling may be disabled for the slice. When slice_lmcs_enabled_flag is equal to 1 and slice_chroma_residual_scale_flag is not present, it is inferred to be equal to pic_chroma_residual_scale_flag.

In another embodiment, the above syntax design can also be applied in scaling list signaling. For example, a pic_scaling_list_enabled_present_flag is signaled before pic_scaling_list_present_flag in PH to indicate whether scaling list related syntax, i.e. pic_scaling_list_present_flag and pic_scaling_list_aps_id, is signaled in PH or not. Furthermore, only if pic_scaling_list_enabled_present_flag is true, pic_scaling_list_present_flag and pic_scaling_list_aps_id are present in the PH. Otherwise (pic_scaling_list_enabled_present_falg is false), no scaling list related syntax is needed to be signaled in PH. In another embodiment, scaling list syntax can be signaled in the slice header. For example, if sps_scaling_list_enabled_flag is enabled, and pic_scaling_list_enabled_present_flag is false, slice_scaling_list_enabled_flag will be signaled in the slice header. Furthermore, if slice_scaling_list_enabled_flag is true, the other scaling_list related syntax will be signaled, i.e. slice_scaling_list_aps_id. In another example, if sps_scaling_list_enabled_flag is enabled, slice_scaling_list_enabled_flag will be signaled in the slice header regardless of pic_scaling_list_enabled_present_flag. Also, the scaling list signaled in the slice header can overwrite the scaling_list signaled in PH.

TABLE 10

Signaling syntax of scaling list data in PH according to one embodiment of the present invention

| |
|---|
| if( sps_scaling_list_enabled_flag ) { |
|     pic_scaling_list_enabled_present_flag |
|     if (pic_scaling_list_enabled_present_flag) { |
|         pic_scaling_list_present_flag     u(1) |
|         if( pic_scaling_list_present_flag ) |
|             pic_scaling_list_aps_id     u(3) |
|     } |
| } |

TABLE 11

Signaling syntax of scaling list data in Slice Header according to one embodiment of the present invention

| |
|---|
| if(sps_scaling_list_enabled_flag && ! pic_scaling_list_enabled_present_flag) { |
|     slice_scaling_list_present_flag |
|     if(slice_scaling_list_present_flag) { |
|         slice_scaling_list_aps_id |
|     } |
| } | pic_scaling_list_enabled_present_flag equal to 1 specifies that pic_scaling_list_present_flag and pic_scaling_list_aps_id are present in the PH. pic_scaling_list_enabled_present_flag equal to 0 specifies that pic_scaling_list_present_flag and pic_scaling_list_aps_id are not present in the PH. When pic_scaling_list_enabled_present_flag is not present, it is inferred to be equal to 0.

slice_scaling_list_present_flag equal to 1 specifies that the scaling_list data used for the slice is derived based on the scaling list data contained in the referenced scaling list APS. slice_scaling_list_present_flag equal to 0 specifies that the scaling list data used for the slice is set to be equal to 16. When not present, the value of slice_scaling_list_present_flag is inferred to be equal to pic_scaling_list_present_flag.

slice_scaling_list_aps_id specifies the adaptation_parameter_set_id of the scaling list APS. The TemporalId of the APS NAL unit having aps_params_type equal to SCALING APS and adaptation_parameter_set_id equal to slice_scaling_list_aps_id shall be less than or equal to the TemporalId of the coded slice NAL unit. When not present and slice_scaling_list_present_flag is equal to 1, the value of slice_scaling_list_aps_id is inferred to be equal to pic_scaling_list_aps_id.

SubPicture ID

In JVET-P2001, VVC Draft, one picture can include several subpictures. To identity individual subpictures, the corresponding subpicture ids are signaled in SPS, PPS, or picture header to specify the index of each subpictures. In this invention, it is proposed to add a constraint to make sure that the signaled subpicture ids for subpictures are unique. The related syntax and semantics are as follows.

SubPictureID: Proposed method 1

As specified in JVET-P2001, sps_subpic_id[i] specifies that subpicture ID of the i-th subpicture. The length of the sps_subpic_id[i] syntax element is sps_subpic_id_len_minus1+1 bits. When not present, and when sps_subpic_id_present_flag equal to 0, the value of sps_subpic_id[i] is inferred to be equal to i, for each i in the range of 0 to sps_num_subpics_minus1, inclusive. According to an embodiment of the present invention, it is a requirement of bitstream conformance that sps_subpic_id[i] and sps_subpic_id[j] shall be different if i is not equal to j.

As specified in JVET-P2001, pps_subpic_id[i] specifies that subpicture ID of the i-th subpicture. The length of the pps_subpic_id[i] syntax element is pps_subpic_id_len_minus1+1 bits. According to an embodiment of the present invention, it is a requirement of bitstream conformance that pps_subpic_id[i] and pps_subpic_id[j] shall be different if i is not equal to j.

As specified in JVET-P2001, ph_subpic_id[i] specifies that subpicture ID of the i-th subpicture. The length of the ph_subpic_id[i] syntax element is ph_subpic_id_len_minus1+1 bits. According to an embodiment of the present invention, it is a requirement of bitstream conformance that ph_subpic_id[i] and ph_subpic_id[j] shall be different if i is not equal to j.

The list SubpicIdList[i] is derived as follows:
for (i=0; i<=sps_num_subpics_minus1; i++)
  SubpicIdList[i]=sps_subpic_id_present_flag?
    (sps_subpic_id_signalling_present_flag?sps_subpic_id[i]:
    (ph_subpic_id_signalling_present_flag?ph_subpic_id[i]: pps_subpic_id[i])): i SubPictureID: Proposed method 2

To well distigush each subpicture, instead of adding a bitstream conformance requirement on subpicture IDs, it can be achieved by constraining SubpicIdList[ ] according to one embodiment of the preent invention. An example of syntax dentax design according to the embodiment is shown as follows.

ph_subpic_id[i] specifies that subpicture ID of the i-th subpicture. The length of the ph_subpic_id[i] syntax element is ph_subpic_id_len_minus1+1 bits. According to one embodiment, the list SubpicIdList[i] is derived as follows:
for (i=0; i<=sps_num_subpics_minus1; i++)
  SubpicIdList[i]=sps_subpic_id_present_flag?
    (sps_subpic_id_signalling_present_flag?sps_subpic_id[i]:
    (ph_subpic_id_signalling_present_flag?ph_subpic_id[i]: pps_subpic_id[i])): i According to an embodiment of the present invention, it is a requirement of bitstream conformance that SubpicIdList[i] and SubpicIdList[j] shall be different, if i is not equal to j.

SubPictureID: Proposed method 3

As specified in JVET-P2001, a syntax, i.e. sps_subpic_id_len_minus1 is signaled in SPS to indicate the number of bits used to represent the syntax element sps_subpic_id[i] and sps_num_subpics_minus1 plus 1 specifies the number of subpictures. In one embodiment, the range of sps_subpic_id_len_minus1 shall be be further constrained based on the value of sps_num_subpics_minus1. For example, the value of (1<<(sps_subpic_id_len_minus1 plus 1)) should be greater than or equal to (sps_num_subpics_minus1 plus 1).

In another example, the value of sps_subpic_id_len_minus1 should be greater than or equal to Ceil(Log 2(sps_num_subpics_minus1 plus))−1. In another embodiment, the same constraints shall be applied to pps_subpic_id_len_minus1 in PPS. For example, the value of (1<<(pps_subpic_id_len_minus1 plus 1)) should be greater than or equal to (pps_num_subpics_minus1 plus 1). In another embodiment, the same constraints shall be applied to ph_subpic_id_len_minus1 in PH. For example, the value of (1<<(ph_subpic_id_len_minus1 plus 1)) should be greater than or equal to (ph_num_subpics_minus1 plus 1).

In another embodiment, sps/pps/ph_subpic_id_len_minus1 can be renamed as sps/pps/ph_subpic_id_len_minus_offset, and sps/pps/ph_subpic_id_len_minus_offset plus an offset, where the offset is set equal to Ceil(Log 2(sps/pps_num_subpics_minus1 plus 1).

pps_num_subpics_minus1 plus 1 specifies the number of subpictures in the coded pictures referring to the PPS.

It is a requirement of bitstream conformance that the value of pps_num_subpic_minus1 shall be equal to sps_num_subpics_minus1.

pps_subpic_id_len_minus_offset plus Ceil(Log 2(pps_num_subpics_minus1 plus 1)) specifies the number of bits used to represent the syntax element pps_subpic_id[i]. The value of pps_subpic_id_len_minus1 shall be in the range of 0 to 15, inclusive.

It is a requirement of bitstream conformance that the value of pps_subpic_id_len_minus1 shall be the same for all PPSs that are referred to by coded pictures in a CLVS.

pps_subpic_id[i] specifies the subpicture ID of the i-th subpicture. The length of the pps_subpic_id[i] syntax element is pps_subpic_id_len_minus1+1 bits.

ph_subpic_id_len_minus_offset plus Ceil(Log 2(pps_num_subpics_minus1 plus 1)) specifies the number of bits used to represent the syntax element ph_subpic_id[i]. The value of pic_subpic_id_len_minus1 shall be in the range of 0 to 15, inclusive.

It is a requirement of bitstream conformance that the value of ph_subpic_id_len_minus1 shall be the same for all PHs that are referred to by coded pictures in a CLVS.

ph_subpic_id[i] specifies that subpicture ID of the i-th subpicture. The length of the ph_subpic_id[i] syntax element is ph_subpic_id_len_minus1+1 bits.

The list SubpicIdList[i] is derived as follows:
for (i=0; i<=sps_num_subpics_minus1; i++)
  SubpicIdList[i]=sps_subpic_id_present_flag?(76)
    (sps_subpic_id_signalling_present_flag?sps_subpic_id[i]:
    (ph_subpic_id_signalling_present_flag?ph_subpic_id[i]: pps_subpic_id[i])): i Any of the foregoing proposed methods can be implemented in encoders and/or decoders. For example, any of the proposed methods can be implemented in an Inter/Intra/prediction/transform module of an encoder, and/or an inverse transform/Inter/Intra/prediction module of a decoder. Alternatively, any of the proposed methods can be implemented as a circuit coupled to the inverse transform/Inter/Intra/prediction module of the encoder and/or the Inter/Intra/prediction/transform module of the decoder, so as to provide the information needed by the Inter/Intra/prediction/transform module.

Figure 6:
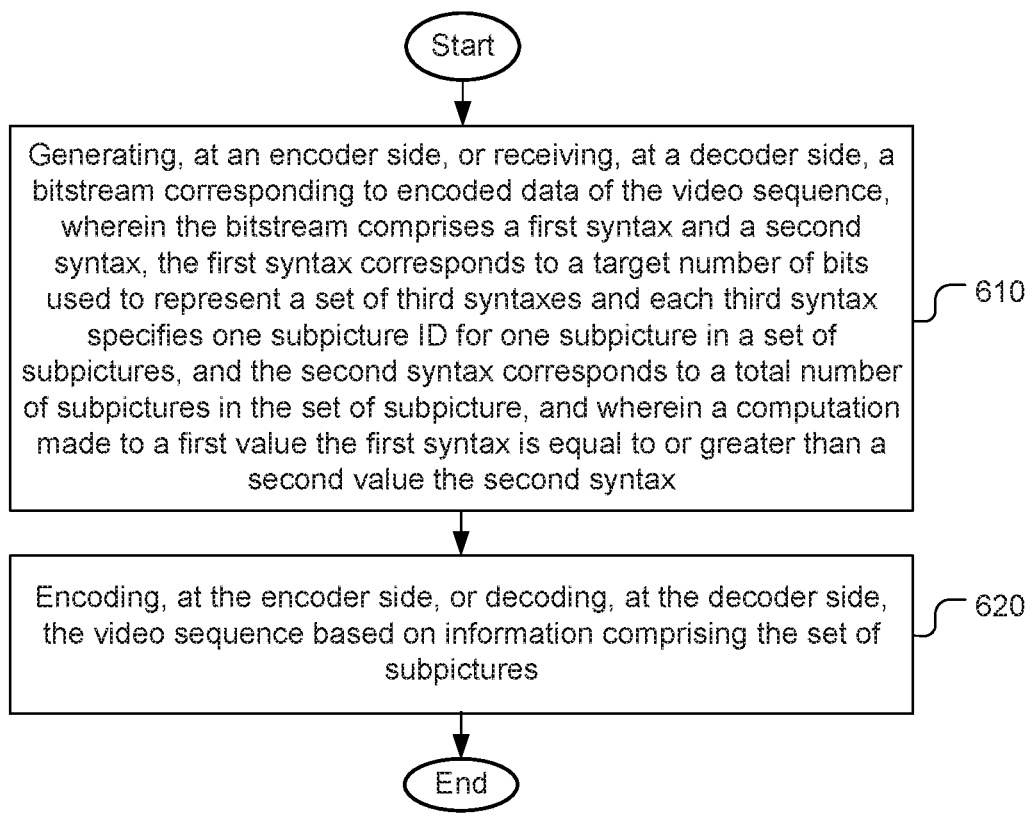
FIG. 6 illustrates a flowchart of an exemplary coding system that uses constrained subpicture syntaxes according to an embodiment of the present invention.

FIG. 6 illustrates a flowchart of an exemplary coding system that uses constrained subpicture syntaxes according to an embodiment of the present invention. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, a bitstream corresponding to encoded data of the video sequence is generated at an encoder side or received at a decoder side in step 610, where the bitstream comprises a first syntax and a second syntax, the first syntax corresponds to a target number of bits used to represent a set of third syntaxes and each third syntax specifies one subpicture ID for one subpicture in a set of subpictures, and the second syntax corresponds to a total number of subpictures in the set of subpicture, and where a computation made to a first value of the first syntax is equal to or greater than a second value of the second syntax. The video sequence is encoded, at the encoder side, or decoded, at the decoder side, based on information comprising the set of subpictures in step 620.

Figure 7:
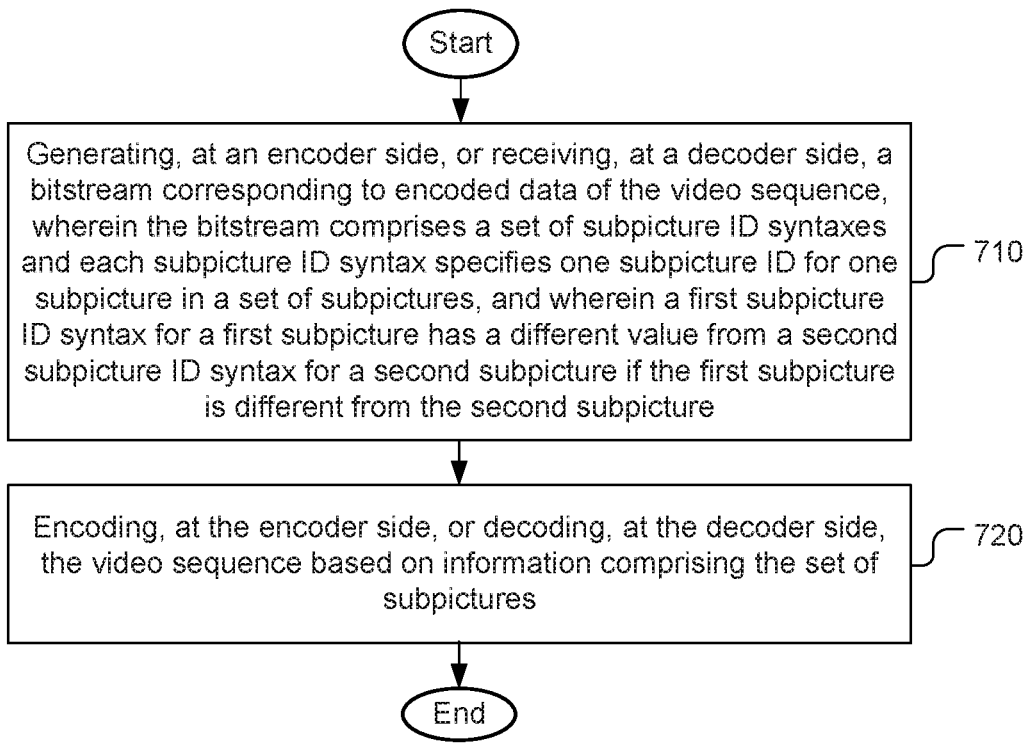
FIG. 7 illustrates a flowchart of another exemplary coding system that uses constrained subpicture syntaxes according to an embodiment of the present invention.

FIG. 7 illustrates a flowchart of another exemplary coding system that uses constrained subpicture syntaxes according to an embodiment of the present invention. According to this method, a bitstream corresponding to encoded data of the video sequence is generated at an encoder side or received at a decoder side in step 710, where the bitstream comprises a set of subpicture ID syntaxes and each subpicture ID syntax specifies one subpicture ID for one subpicture in a set of subpictures, and wherein a first subpicture ID syntax for a first subpicture has a different value from a second subpicture ID syntax for a second subpicture if the first subpicture is different from the second subpicture. The video sequence is encoded, at the encoder side, or decoded, at the decoder side, based on information comprising the set of subpictures in step 720.

The flowchart shown is intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for coding a video sequence, wherein a subpicture coding mode is included, the method comprising:
generating, at an encoder side, or receiving, at a decoder side, a bitstream corresponding to encoded data of the video sequence, wherein the bitstream comprises a first syntax and a second syntax, the first syntax corresponds to a target number of bits used to represent a set of third syntaxes and each third syntax specifies one subpicture ID for one subpicture in a set of subpictures, and the second syntax corresponds to a total number of subpictures in the set of subpicture, and wherein a computation made to a first value of the first syntax is equal to or greater than a second value of the second syntax; and
encoding, at the encoder side, or decoding, at the decoder side, the video sequence based on information comprising the set of subpictures,
wherein the first value of the first syntax is the target number of bits minus 1,
wherein the computation made to the first value of the first syntax corresponds to (1<<((the target number of bits minus 1)+1), and wherein "<<" represents an arithmetic left shift operation.

2. The method of claim 1, wherein the first syntax and the second syntax are signaled, at the encoder side, or parsed, at the decoder side, in sequence parameter set (SPS).

3. The method of claim 1, wherein the first syntax and the second syntax are signaled, at the encoder side, or parsed, at the decoder side, in sequence parameter set (SPS), picture parameter set (PPS), slice header (SH), picture header (PH) or a combination thereof.

4. The method of claim 1, wherein the first syntax is in sequence parameter set (SPS) and designated as sps_subpic_id_len_minus1 for representing the target number of bits minus 1.

5. The method of claim 1, wherein the second syntax is in sequence parameter set (SPS) and designated as sps_num_subpic_minus1 for representing the total number of subpictures in the set of subpicture minus 1.

6. The method of claim 1, wherein the first syntax corresponds to the target number of bits minus an offset and plus a first value, and wherein the first value corresponds to Ceil(Log 2 (the total number of subpictures)), and wherein "Ceil" is a ceiling function and "Log 2" is a log-base-2 function.

7. The method of claim 1, wherein the bitstream satisfies a bitstream conformance requirement that the first number is equal to or greater than the total number of subpictures.

8. An apparatus for coding a video sequence, wherein a subpicture coding mode is included, the apparatus comprising one or more electronic circuits or processors arranged to:
   generate, at an encoder side, or receive, at a decoder side, a bitstream corresponding to encoded data of the video sequence, wherein the bitstream comprises a first syntax and a second syntax, the first syntax corresponds to a target number of bits used to represent a set of third syntaxes and each third syntax specifies one subpicture ID for one subpicture in a set of subpictures, and the second syntax corresponds to a total number of subpictures in the set of subpicture, and wherein a computation made to a first value of the first syntax is equal to or greater than a second value of the second syntax; and
   encode, at the encoder side, or decode, at the decoder side, the video sequence based on information comprising the set of subpictures,
   wherein the first value of the first syntax is the target number of bits minus 1,
   wherein the computation made to the first value of the first syntax corresponds to (1<<((the target number of bits minus 1)+1), and wherein "<<" represents an arithmetic left shift operation.

\* \* \* \* \*